United States Patent [19]
Warnant et al.

[11] 3,761,591
[45] Sept. 25, 1973

[54] NOVEL PREGNADIENE
[75] Inventors: Julien Warnant, Neuilly S/Seine;
Andre Farcilli, Rosny-sous-Bois,
both of France
[73] Assignee: Roussel Uclaf, Paris, France
[22] Filed: Feb. 29, 1972
[21] Appl. No.: 230,507

Related U.S. Application Data
[62] Division of Ser. No. 112,387, Feb. 3, 1971, Pat. No. 3,679,714.

[30] Foreign Application Priority Data
Feb. 20, 1970 France .............................. 7006179

[52] U.S. Cl. ................................................ 424/242
[51] Int. Cl. .............................................. A61k 17/00
[58] Field of Search ................... 424/242; 260/397.3

[56] References Cited
UNITED STATES PATENTS
3,086,027  4/1963  Perelman et al. ............... 260/397.3
3,277,122  10/1966  Alvarez ............................ 260/397.3
3,679,714  7/1972  Warnant et al. ................. 260/397.3

Primary Examiner—Shep K. Rose
Attorney—Hammond & Littell

[57] ABSTRACT
$17\alpha,21$-dimethyl-19-nor-$\Delta^{4,9}$-pregnadiene-3,20-dione of the formula

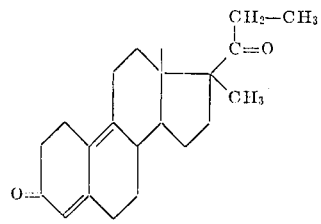

I having antigonado-hypophysial, progestomimetic and progestative activity and its preparation.

5 Claims, No Drawings

NOVEL PREGNADIENE

This is a division of Ser. No. 112,387, filed Feb. 3, 1971 now U.S. Pat. No. 3,679,714.

OBJECTS OF THE INVENTION

It is an object of the invention to provide the novel product, $17\alpha,21$-dimethyl-19-nor-$\Delta^{4,9}$-pregnadiene-3,20-dione.

It is another object of the invention to provide a novel process for the preparation of $17\alpha,21$-dimethyl-19-nor-$\Delta^{4,9}$-pregnadiene-3,20-dione.

It is another object of the invention to provide novel pharmaceutical compositions having antigonado-hypophysial, progestomimetic and progestative activity.

It is a further object of the invention to provide a method of inducing antigonado-hypophysial, progestomimetic and progestative activity in warm blooded animals.

These and other objects and advantages of the invention will become obvious from the following description.

THE INVENTION

The novel product of the invention is $17\alpha,21$-dimethyl-19-nor-$\Delta^{4,9}$-pregnadiene-3,20-dione and has interesting pharmacological properties, namely antigonado-hypophysial activity, progestomimetic activity and progestative activity.

The novel process of the invention for the preparation of $17\alpha,21$-dimethyl-19-nor-$\Delta^{4,9}$-pregnadiene-$\delta$ $21\alpha 3,20$-dione comprises reacting 3-methoxy-19-nor-$\Delta^{1,3,5(10),16}$-pregnate-traene-20-one with an alkali metal and a methyl halide to simultaneously reduce the 16,17 double bond and methylate which results in the formation of 3-methoxy-$17\alpha$-methyl-19-nor-$\Delta^{1,3,5(10)}$-pregnatriene-20-one, reducing the latter by the Djerassi method with an alkali metal in the presence of ammonia to form 3-methoxy-$17\alpha$-methyl-19-nor-$\Delta^{2,5(10)}$-pregnadiene-20-ol, hydrolyzing the latter with a dilute acid to obtain $17\alpha$-methyl-19-nor-$\Delta^{5(10)}$-pregnene-20-ol-3-one, oxidizing the latter with an oxidizing acid agent to form $17\alpha$-methyl-19-nor-$\Delta^{5(10)}$-pregnene-3,20-dione and successively brominating with bromine and dehydrobrominating with pyridine to form $17\alpha$-methyl-19-nor-$\Delta^{4,9}$-pregnadiene-3,20-dione and recovering from the crystallization mother liquors $17\alpha,21$-dimethyl-19-nor-$\Delta^{4,9}$-pregnadiene-3,20-dione.

The novel pharmaceutical compositions of the invention having antigonado-hypophysial, progestomimetic and progestative activity are comprised of an effective amount of $17\alpha,21$-dimethyl-19-nor-$\Delta^{4,9}$-pregnadiene-3,20-dione and a pharmaceutical carrier. The compositions may be in the form of injectable solutions or suspensions in ampoules or multiple dose flacons or in the form of implants, tablets, coated tablets, sublingual tablets, capsules and suppositories. The usual individual dose of active compound for the adult is 0.1 to 2.5 mg depending upon the method of administration.

The compound of the invention is useful as progestative agent, as inhibiting hypophysis agent with predominance of anti-LH, and as antiestrogenic agent. It may be used alone or in association with an estrogen such as ethynylestradiol, mestranol or $11\beta$-methoxy-ethynyl estradiol in an estroprogestative formulation with contraceptive action. The compositions of the invention may be used for the treatment of prostatic adenoma, hyperandrogenia, acne, hirsutism and hyperestrogenic manifestations. They can be used in the treatment of sterility, dysmenorrhea and ovarian dystrophy by resting the ovaries by therapeutic blockage of ovulation.

The novel method of the invention for inducing antigonado-hypophysial, progestomimetic and progestative activity in warm-blooded animals comprises administering to warm-blooded animals an effective amount of $17\alpha,21$-dimethyl-19-nor-$\Delta^{4,9}$-pregnadiene-3,20-dione. The said compound may be administered orally, perlingually, transcutaneously or rectally. The usual daily dose is 0.003 to 0.3 mg/kg depending upon the method of administration.

In the following example, there are described several preferred embodiments to illustrate the invention. However, it is to be understood that the invention is not intended to be limited to the specific embodiments.

EXAMPLE

PREPARATION OF $17\alpha,21$-dimethyl-19-nor-$\Delta^{4,9}$-pregnadiene-3,20-dione STEP A: 3-methoxy-$17\alpha$-methyl-19-nor-$\Delta^{1,3,5(10)}$-pregnatriene-20-one 1.150 g of lithium were added with stirring to 1 liter of ammonia cooled to $-70°C$ under an inert atmosphere, and after stirring for 15 minutes, 1 liter of ether was added while maintaining the temperature at about $-75°C$ followed by the addition of 20 g of 3-methoxy-19-nor-$\Delta^{1,3,5(10),16}$-pregnate traene-20-one. The reaction mixture was left for 2 hours with stirring at $-75°C$ under an inert atmosphere and then 160 cc of methyl iodide were added to the reaction mixture. After stirring for another 2 hours at $-75°C$, the ammonia was distilled off and the residue was added to 1 liter of water. The aqueous phase was extracted with ether and the combined ether phases were washed with water until the wash waters were neutral, were dried over sodium sulfate, filtered and distilled to dryness. The 21 g of residue was dissolved in 210 cc of refluxing ethanol and after the addition of 21 cc of acetic acid and 21 g of Girard's reagent T, the mixture was refluxed with stirring for 1½ hours under an inert atmosphere. The reaction mixture was then cooled to room temperature and was added to 1,050 cc of water. 155 cc of 2N sodium hydroxide were added thereto and the mixture was extracted with ether, the combined ether phases were washed with water until the wash waters were neutral, then were dried over sodium sulfate, filtered and evaporated to dryness to obtain 16.80 g of raw product. The latter was purified by dissolution in refluxing acetone and crystallization from hot and cold acetone to obtain 3-methoxy-$17\alpha$-methyl-19-nor-$\Delta^{1,3,5(10)}$-pregnatriene-20-one.

STEP B: 3-methoxy-$17\alpha$-methyl-19-nor-$\alpha^{2,5(10)}$-pregnadiene-20-ol 1

A solution of 20 g of 3-methoxy-$17\alpha$-methyl-19-nor-$\Delta^{1,3,5(10)}$-pregnatriene-20-one in 400 cc of tetrahydrofuran was added to 500 cc of ammonia and then 10 cc of ethanol were added. The interior temperature was lowered to about $-35°C$ and then 2.15 g of lithium were added thereto under an inert atmosphere. After agitating for 15 minutes, 10 cc of ethanol and another 2.15 g of lithium were added thereto. The mixture was stirred for 15 minutes and again 30 cc of ethanol and then 2.15 g of lithium were added. After 30 minutes at $-35°C$, 30 cc of ethanol were added and the ammonia was evaporated with the temperature returning to 20°C. 500 cc of water were added thereto and the mixture was extracted with ether. After the extraction with ether, the aqueous phase was drawn off and the combined ether phases were washed with water, dried over sodium sulfate, filtered and distilled to dryness to obtain 3-methoxy-17α-methyl-19-nor-$\Delta^{2,5,(10)}$-pregnadiene-20-ol which was used as is for the next step.

STEP C: 17α-methyl-19-nor-$\Delta^{5(10)}$-pregnene-20-ol-3-one

A solution of 20 g of 3-methoxy-17α-methyl-19-nor-$\Delta^{2,5(10)}$-pregnadiene-20-ol in 35 cc of acetone was stirred for 15 minutes at room temperature and then 300 cc of acetic acid containing 25 percent of water were added thereto. The reaction mixture was stirred for 3 hours and was then added to a mixture of water and ether and stirred for 10 minutes. After extraction with ether the aqueous phase was discarded and the ether phase was washed with aqueous sodium bicarbonate solution, then with water, was dried over sodium sulfate, filtered and distilled to dryness to obtain 17α-methyl-19-nor-$\Delta^{5(10)}$-pregnene-20-ol-3-one which was used as is for the next step.

STEP D: 17α-methyl-19-nor-$\Delta^{5,(10)}$-pregnene-3,20-dione 21 cc of a dilute solution containing 5.7 g of chromic anhydride and 4.8 cc of concentrated sulfuric acid were added with agitation and under a nitrogen atmosphere to a solution of 20.5 g of 17α-methyl-19-nor-$\Delta^{5(10)}$-pregnene-20-ol-3-one in 615 cc of acetone cooled to −20°C and the mixture was allowed to stand at −10°C for 1 hour and was then poured in 2 liters of a water-ice mixture. The mixture was extracted with benzene and the combined extracts were washed first with water, then a saturated sodium bicarbonate solution and then with water. The extracts were dried over magnesium sulfate and then were distilled to dryness to obtain 20.40 g of raw product. The latter was purified by chromatography over magnesium silicate, elution with benzene containing 2.5 percent of acetone and crystallization from isopropyl ether to obtain 17α-methyl-19-nor-$\Delta^{5(10)}$-pregnene-3,20-dione.

STEP E: 17α,21-dimethyl-19-nor-$\Delta^{4,9}$-pregnadiene-3,20-dione 16.3 cc of a solution of 29 percent of bromine in methanol were added with agitation under a nitrogen atmosphere to a solution of 8.50 g of 17α-methyl-19-nor-$\Delta^{5(10)}$-pregnene-3,20-dione in 85 cc of pyridine cooled to 0°C and the mixture was stirred for 30 minutes at 0°C. The temperature was allowed to return to room temperature and the mixture was stirred for 16 hours. The mixture was added to 850 cc of a water-ice mixture and 82 cc of hydrochloric acid were added thereto. The mixture was extracted with methylene chloride and the combined extracts were washed with water until the wash waters were neutral, dried over magnesium sulfate and distilled to dryness to obtain 8.480 g of crude product which is purified by cristallization from isopropyl ether to obtain 5.810 g of 17-α-methyl-19-nor-$\Delta^{4,9}$-pregnadiene-3,20-dione melting at 106°C and identical to the product of Belgian patent No. 674,178.

The mother liquors from the purification of the said product were combined and evaporated to dryness. The residue was fractionated by chromatography over silica gel (Kieselgel) and elution with a 7-3 mixture of benzene-ethyl acetate. The first fractions were discarded and the ensuing fraction was evaporated to obtain colorless crystals. The product was purified by empasting with 5 volumes of boiling isopropyl ether and the crystals formed after cooling were recovered by vacuum filtration, were washed twice with 2-volumes of isopropyl ether and dried in a ventilated atmosphere to obtain 17α,21-dimethyl-19-nor-$\Delta^{4,9}$-pregnadiene-3,20-dione melting at 152°C and having a specific rotation [$\alpha\pi_D^{20}$ = −262° ($c$= 0.5% in ethanol). The cream-white product was soluble in acetone and benzene and insoluble in water.

Analysis: $C_{22}H_{30}O_2$ ; molecular weight = 326.45
Calculated: % C 80.93 % H 9.26
Found: 80.6–80.7 9.2–9.3
U. V. Spectrum (ethanol):
Max. at 215 mµ $E_{1cm}^{1\%}$ = 202
Inflex towards 234 mµ $E_{1cm}^{1\%}$ = 155
Inflex. towards 245 mµ $E_{1cm}^{1\%}$ = 120
τ max. at 305 mµ $E_{1cm}^{1\%}$ = 648 or ε = 21,150
RMN Spectrum — in accord with proposed structure
21-methyl—at 55, 61.5 and 68 Hz
17-methyl—at 66Hz
4-ethylenic proton—339
13-methyl—at 46.5 Hz As far as is known, this compound is not described in the literature.

PHARMACOLOGICAL STUDY

A. Progestomimetic Activity

The progestomimetic activity was determined by the Clauberg test using immature rabbits previously sensitized 5 days earlier by subcutaneously administering 10 µg of estradiol benzoate. They are treated with doses of the test compound for 5 days and are killed on the sixth day. Sections of the uterus are examined in MacPhail units for the proliferation of endometric lacework, characteristic of progestomimetic action. The test compound was administered subcutaneously as a solution in olive oil containing 5 percent benzylic alcohol at a dose of 1.56, 3.12 and 6.25 γ. The results are reported in Table I.

TABLE I

| Product | Doses in γ/day | MacPhail Units |
|---|---|---|
| 17α,21-dimethyl-19-nor-$\Delta^{4,9}$-pregna-diene-3,20-dione | 1.56 | 2.0 |
| | 3.1 | 2.6 |
| | 6.2 | 2.7 |

The results of Table I show that the test compound has a clear progestomimetic activity at a dose of 1.56γ. Under similar test conditions, 6-chloro-17α-acetoxy-$\Delta^{4,6}$-pregnadiene-3,20-dione at 1.56 γ per day had a MacPhail of 1.0, at a dose of 3.12γ an index of 2.4. Therefore the compound of the invention has twice the progestomimetic activity of 6-chloro-17α-acetoxy-$\Delta^{4,6}$-pregnadiene-3,20-dione when administered subcutaneously.

B. Antigonadotrophic Activity

The antigonadotrophic activity was determined on puberic rats weighing about 200 g. The compounds were administered subcutaneously as a solution in sesame oil containing 5 percent benzylic alcohol in a volume of 0.2 cc in 12 treatments over 14 days at the daily dose of 0.2 and 1 mg per rat. On the 15th day, the rats were sacrificed by carotidienic bleeding and the seminal vesicles, prostate, testicles and surrenals were removed and weighed. The results are reported in Table II.

TABLE II

| product | doses | testicles in g | seminal vesicles in mg | prostate in mg | surrenals in mg |
|---|---|---|---|---|---|
| control | 0 | 2.04 | 529.6 | 320.2 | 40.3 |
| 17α,21 di-methyl-19-nor-α⁴, 9-pregnadiene-3,20-dione | 200γ | 2.56 | 272.0 (−50%) | 244.0 (−24%) | 49.1 |
|  | 1 mg | 2.64 | 145.6 (−73%) | 172.5 (−46%) | 45.5 |

The results of Table II show that the compound of the invention possesses a clear, predominantly anti-LH antigo-nadotrophic activity at a dose of 200γ without provoking surrenalienic aplasia.

C. Antiestrogenic Activity

The antiestrogenic activity was determined on immature mice by a technique inspired by the test of Rubin [Endo., Vol. 49 (1951), p.429] and similar to that of Dorfman et al. [Methods in Hormone Research, Vol. II, 1962, p. 118]. Groups of 4 mice 19 to 21 days old received daily subcutaneously for three days an injection of estradiol alone, an injection of the test product alone or an injection of estradiol and the test product. In the last case, the two steroids were injected at different points. The animals were killed on the fourth day and the uterus was removed and weighed.

The estradiol in solution in olive oil containing 5 percent benzylic alcohol was administered at a total dose of 0.27γ, each injection having a volume of 0.1 cc per mouse. The test compound in solution in olive oil containing 5 percent benzylic alcohol was administered to two lots of mice at increasing doses of 1.1γ, 3.3γ and 10γ and also 3.3γ, 10γ and 30γ. The results reported below show a clear anti-estrogenic activity.

1.1γ — 31 percent of the effect of 0.27γ of estradiol
3.3γ — 37 percent
10.0γ — 47 percent
3.3γ — 32 percent
10.0γ — 47 percent
30.0γ — 38 percent D. Maintaining of Gestation Puberic rats weighing about 250 g were left in contact with male rats and the first day of gestation (J-1) was determined by the presence of spermatozoon in a vaginal smear. On the 8th day (J-8), the female rats were castrated under ether anesthesia and from the 8th to the 19th day, the test product was subcutaneously administered every day in solution in sesame oil containing 5% benzylic alcohol at a volume of 0.5 cc. On the 20th day (J-20), the animals were killed and the activity of the product was determined by the number of fetuses in term at J-20 with respect to the number of implantations at J-8 expressed as a percentage. The results are reported in Table III.

TABLE III

| Product | dose in mg | rats in gestation J-8 | J-20 | placentas J-8 | J-20 | % fetuses per no. implantations at J-8 |
|---|---|---|---|---|---|---|
| controls | 0 | 8 | 0 | 9.1 | | |
| 17α,21-di-methyl-19-nor-Δ⁴,⁹-pregnadiene-3,20-dione | 2 | 8 | 8 | 12.0 | 12.0 | 72% |
|  | 0.5 | 8 | 8 | 10.6 | 10.6 | 74% |

The results of Table III show that the compound of the invention almost totally maintained gestation in rats at a dose of 0.5 mg.

Various modifications of the compositions and method of the invention may be made without departing from the spirit or scope thereof and it is to be understood that the invention is to be limited only as defined in the appended claims.

We claim:

1. A pharmaceutical composition comprising an effective amount of 17α,21-dimethyl-19-nor-Δ⁴,⁹-pregnadiene-3,20-dione and a pharmaceutical carrier.

2. A composition of claim 1 which also contains an estrogen.

3. A method of inducing progestomimetic activity in warm-blooded animals which comprises administering to warm-blooded animals a safe and effective amount of 17α,21-dimethyl-19-nor-Δ⁴,⁹-pregnadiene-3,20-dione.

4. A method of inducing antigonado-hypophysial activity in warm-blooded animals which comprises administering to warm-blooded animals a safe and effective amount of 17α,21-dimethyl-19-nor-Δ⁴,⁹-pregnadiene-3,20-dione.

5. A method of inducing progestative activity in warm-blooded animals which comprises administering to warm-blooded animals a safe and effective amount of 17α,21-dimethyl-19-nor-Δ⁴,⁹-pregnadiene-3,20-dione.

* * * * *